United States Patent [19]
Kubo

[11] Patent Number: 5,429,224
[45] Date of Patent: Jul. 4, 1995

[54] PARTS-CONVEYING APPARATUS
[75] Inventor: Masao Kubo, Namerikawa, Japan
[73] Assignee: YKK Corporation, Tokyo, Japan
[21] Appl. No.: 285,723
[22] Filed: Aug. 4, 1994
[30] Foreign Application Priority Data Aug. 17, 1993 [JP] Japan .................. 5-225174

[51] Int. Cl.⁶ ............................................. B65G 19/00
[52] U.S. Cl. ................... 198/728; 198/688.1; 198/391
[58] Field of Search ................. 198/391, 463.4, 688.1, 198/690.2, 692, 717, 725, 728, 699.1, 719, 733

[56] References Cited
U.S. PATENT DOCUMENTS

| 1,107,730 | 8/1914 | Torrance | 198/688.1 |
| 2,784,835 | 3/1957 | Dixon | 198/699.1 X |
| 3,704,780 | 12/1972 | Aidlin et al. | 198/728 X |
| 4,206,539 | 6/1980 | Weresch | 198/391 X |
| 4,629,054 | 12/1986 | Fondo | 198/391 X |
| 4,633,995 | 1/1987 | Hamada | 193/2 R |
| 5,228,554 | 7/1993 | Kuchta et al. | 198/699.1 X |

FOREIGN PATENT DOCUMENTS

| 0216203 | 4/1987 | European Pat. Off. | |
| 2019923 | 11/1971 | Germany | |
| 2161081 | 6/1973 | Germany | 198/699.1 |
| 3413234 | 11/1984 | Germany | |
| 0188080 | 8/1986 | Japan | 198/699.1 |
| 5-246527 | 9/1993 | Japan | 198/688.1 |
| 0605350 | 9/1978 | Switzerland | 198/688.1 |

Primary Examiner—Cheryl L. Gastineau
Attorney, Agent, or Firm—Hill, Steadman & Simpson

[57] ABSTRACT

A parts-conveying apparatus comprising an elongated guide member having a guide channel extending throughout the entire length of the guide member for supporting parts therein; and an endless belt unit comprising a pair of rollers and an endless belt wrapped around the rollers, one of the rollers being operatively connected to a drive source, the endless belt having one substantially rectilinear part extending alongside of the guide channel substantially over its entire length in order to feed the parts.

5 Claims, 3 Drawing Sheets

PARTS-CONVEYING APPARATUS

BACKGROUND OF THE INVENTION

1. Field of the Invention

The present invention relates to parts-conveying apparatus for conveying parts from a parts feeder to an assembling station with parts keeping their correct arrangement and posture.

2. Description of the Prior Art

When parts are conveyed to an assembling station in an automatic assembling machine, such parts must be conveyed in such proper arrangement or posture as to meet the subsequent operation carried out at the assembling station. If the part to be worked on is different in shape either between the upper side and the lower side or between the front side and the rear side, the necessity of conveying the parts in such proper arrangement and posture is more pronounced.

An apparatus which has been commonly used for this purpose comprises a bowl-shaped parts feeder for storing parts and a downward-inclined or vertical gravity-type chute having its upper end joined to an outlet of the parts feeder for feeding the parts from the parts feeder through the chute to the assembling station via their own gravity. Since the parts must slide down the chute via their own gravity, the parts feeder must be positioned far above the assembling station of the automatic assembling machine.

Considering the subsequent operation to be carried out at the assembling station of the automatic assembling machine, the parts must be fed to the assembling station intermittently. It must be ensured that an ensuing part be ready at the lower end of the chute well before a preceding part is finished.

However, if parts are different in shape between their front side and rear side, sometimes, feeding of parts is interrupted and sometimes, parts are supplied, at once, in a large number, in other words, smooth and stable feeding of parts cannot be accomplished. Therefore, there is no guarantee that a part is always ready for assemblage at the lower end of the chute.

SUMMARY OF THE INVENTION

With the foregoing difficulties in view, it is therefore an object of the present invention to provide a parts-conveying apparatus which ensures that parts can always be made ready for assemblage and parts can be conveyed from a parts feeder to an assembling station with the parts keeping their correct posture and arrangement so that the assembling operation of parts can be carried out without a problem.

According to one aspect of the present invention, there is provided a parts-conveying apparatus comprising; an elongated guide member having a guide channel extending throughout the entire length of the guide member for supporting parts therein; and an endless belt unit comprising a pair of rollers and an endless belt wrapped around the rollers, one of the rollers being operatively connected to a drive source, the endless belt having one substantially rectilinear part extending alongside of the guide channel substantially over its entire length in order to positively feed the parts.

According to another aspect of the present invention, the parts-conveying apparatus further includes a stopper rod disposed beside the guide member and reciprocally movable into and away from the guide channel in order to press the parts against a surface which partly defines the guide channel.

According to still another aspect of the present invention, the endless belt includes means for ensuring the feed of the parts.

According to still another aspect of the present invention, the feed-ensuring means comprising a plurality of brushes planted at equal intervals throughout the full length of the front surface thereof, these brushes being composed of a number of rigid short fibers tightly bonded together.

According to yet another aspect of the present invention, the feed-ensuring means comprises alternate ridges and grooves provided over the entire peripheral length thereof.

According to still another aspect of the present invention, the feed-ensuring means comprises a separate layer of soft synthetic resin wrapped on the endless belt over the entire periphery.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Description of some preferred embodiments of the invention is now made in detail in conjunction with the drawings appended hereto.

Figure 1:
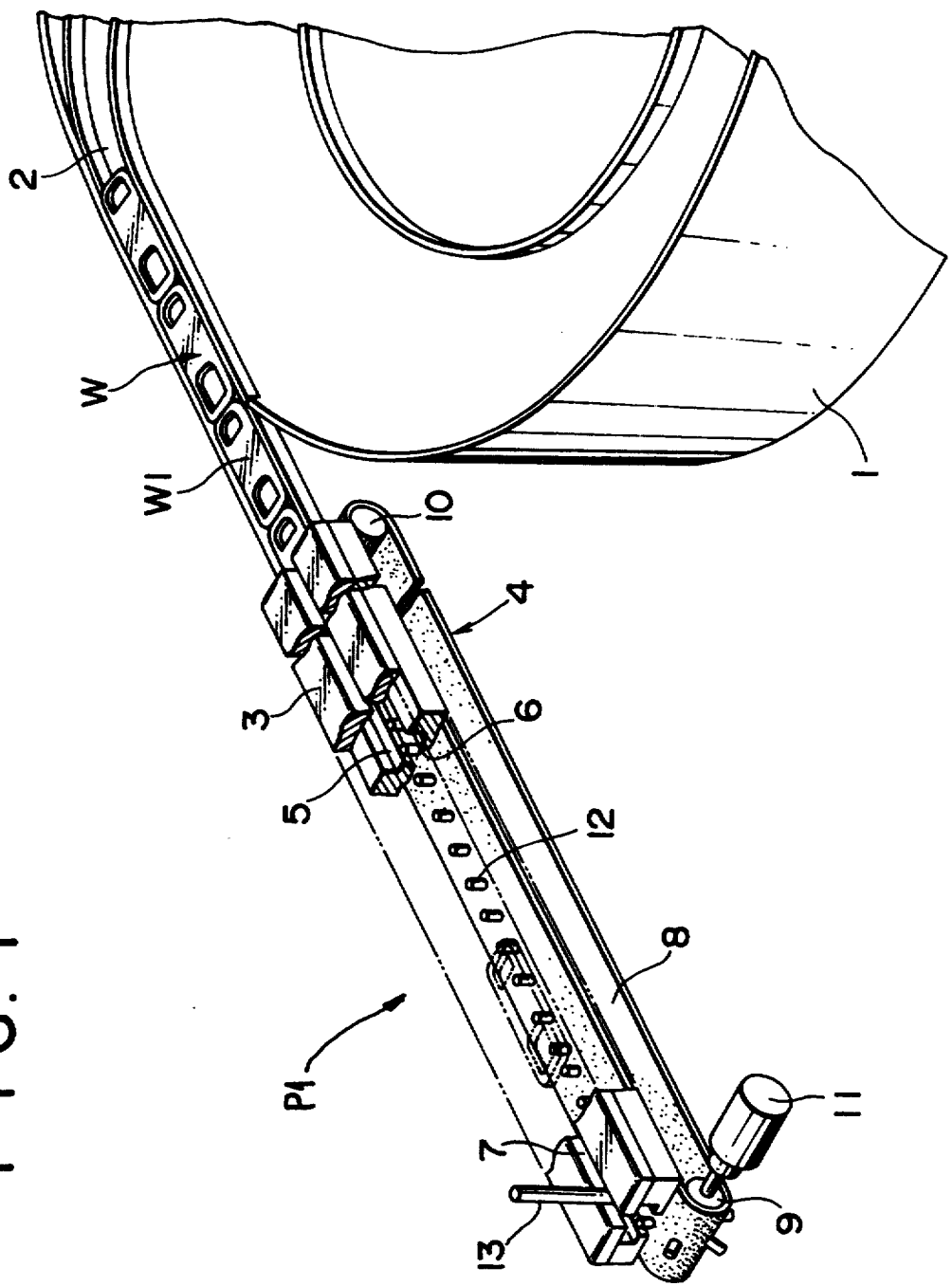
FIG. 1 is a perspective view, partly cutaway, of a parts-conveying apparatus according to a preferred embodiment of the present invention and associated parts.

Referring now to FIG. 1, a parts-conveying apparatus P1 according to this invention is used with a bowl-shaped parts feeder 1 for storing parts W—to be specific, pull tabs W for slide fastener sliders illustrated in FIG. 1,—and a chute 2 joined tangentially to the periphery of the parts feeder 1 to receive parts stocked in the parts feeder. The chute 2 is positioned horizontally. The parts feeder 2 is connected to for example an electromagnetic vibrator (not shown) to vibrationally guide the parts from the parts feeder 1 to the chute 2.

As shown in FIG. 1, the parts-conveying apparatus P1 is positioned horizontally and has its one end joined to one end of the chute 2. The parts-conveying apparatus P1 broadly comprises an elongated guide member 3 adapted for supporting parts W therein; and an endless belt unit 4 adapted for positively feeding the parts W, with the parts W supported by the guide member 3.

Figure 2:
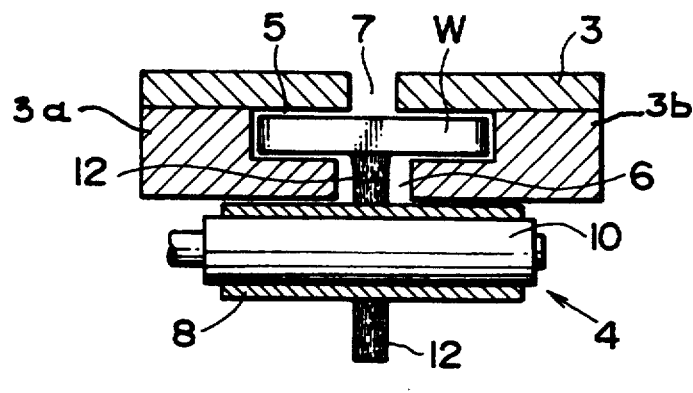
FIG. 2 is a cross-sectional view of the parts-conveying apparatus of FIG. 1.

The construction of the elongated guide member 3 varies according to the shape of the parts W which are to be fed with the guide member 3. The parts-conveying apparatus according the first embodiment illustrated in FIGS. 1 and 2 is intended to feed pull tabs W1 to a assembling station where the pull tabs W1 are to be assembled to slider bodies. The pull tab W1 is a flat rectangular plate and has two apertures; .one larger aperture formed in one end and another smaller aperture formed in the other end. As shown in FIG. 1, the pull tabs W1 are fed along the chute 2 with the larger aperture disposed ahead of the smaller aperture.

As shown in FIGS. 2, the guide member 3 comprises a pair of guide halves 3a, 3b disposed in confronting relation to each other to define a guide channel 5 therebetween. The guide channel 5 extends throughout the full length of the guide member 3. The guide channel 5 has a cross-section which is substantially identical to but slightly greater in width and height than the cross-section of the pull tab W1. The guide member 3 has its upstream end joined to the downstream end of the chute 2, so that the pull tabs W1 can move from the chute 2 into the guide channel 5. The guide member 3 has a slot 6 formed throughout the lower side of the full length thereof so as to communicate with the guide channel 5. Likewise, the guide member 3 has a slit 7 formed throughout the upper side of the full length thereof so as to communicate with the guide channel 5. The slit 7 is slightly less in width than the slot 6.

In the first embodiment illustrated in FIGS. 1 and 2, the endless belt unit 4 is disposed beside and extends in parallel to and substantially coextensive to the elongated guide member 3. The endless belt unit 4 is comprised of at least two terminal rollers 9, 10 and an endless belt 8 wrapped around the terminal rollers 9, 10. One roller 9 is disposed adjacent to the upstream end of the guide member 3 and the other roller 10 is disposed adjacent to the downstream end of the guide member 3. The roller 9 is operatively connected with a drive source such as an electric motor 11 so that the endless belt 8 continuously run around the terminal rollers 9, 10. Should the endless belt 8 be of a length that would make the use of only 2 rollers inefficient or impossible, then a number of rollers may be used, these being equally spaced along the length of the endless belt 8.

Figure 3:
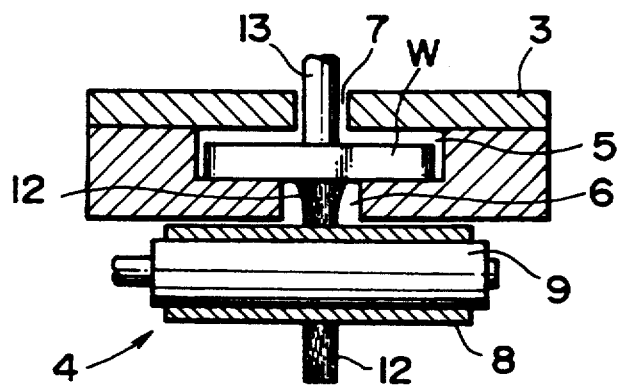
FIG. 3 is a view similar to FIG. 2, but showing another embodiment of the present invention.

The endless belt 8 includes a plurality of brushes 12 planted at equal intervals throughout the full length of the front surface thereof, these brushes being composed of a number of rigid short fibers tightly bonded together. These brushes 12 act as means for ensuring the feed of the parts W, as by increasing the friction coefficient of the endless belt 8. As better shown in FIG. 2, the endless belt unit 4 is arranged alongside of and positioned relative to the guide member 3 such that the brushes 12 planted on the front surface of the endless belt 8 protrude into the guide channel 5 through the slot 6. The electric motor 11 is operatively connected to any suitable means (not shown) for controlling the rotational speed of the electric motor 11. As shown in FIGS. 1 and 3, a stopper rod 13 is disposed above the downstream end of the elongated guide member 3 and reciprocally movable in vertical direction into and away from the guide channel 5 through the slit 7 by a fluid actuator (not shown). Although the stopper rod 13 is shown to be located at the downstream end of the guide member 3, the stopper rod 13 may be located at any intermediate point of the guide member 3.

Since being positioned horizontally, the parts-conveying apparatus P1 cannot rely on the gravity of pull tabs W1 themselves to feed the parts W1 thereon. However, once pull tabs W1 are introduced from the chute 2 into the guide channel 5 of the guide member 3, the pull tabs W1 can be positively conveyed downstream along the guide channel 5 by the brushes 12 of the endless belt 8 continuously running through the guide chamber 5.

During conveyance of the pull tabs W1 along the guide channel 5, the fluid actuator is energized to move the stopper rod 13 down until the stopper rod 13 press a pull tub W1 against a wall partly defining the guide channel 5, as shown in FIG. 3. Consequently, the pull tabs W1 stop at a standby position ready for the assembling operation at the assembling station, whiles the endless belt unit 4 keeps running.

Figure 4:
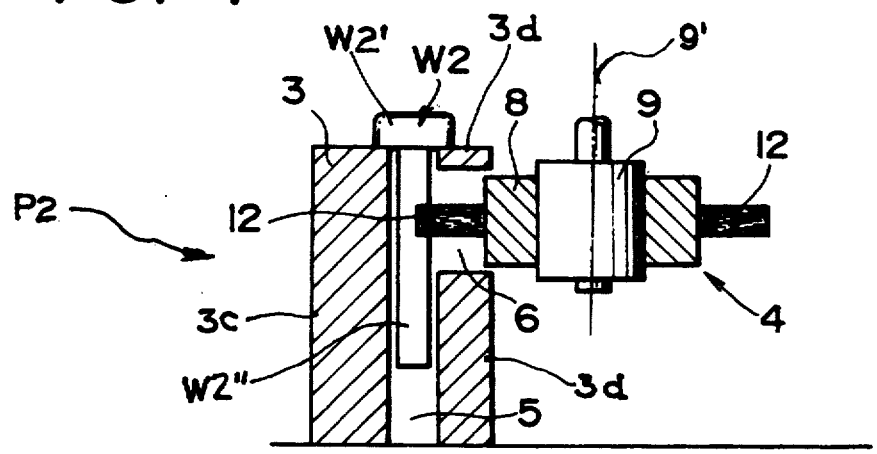
FIG. 4 is a cross-sectional view of a parts-conveying apparatus according to still another embodiment of the present invention.

FIG. 4 shows the second embodiment of the present invention wherein the invention is embodied in a parts-conveying apparatus P2 for conveying bolts W2 from the parts feeder 1 to the assembling station instead of pull tabs W1. The guide member 3 comprises a pair of vertical guide walls 3c, 3d horizontally spaced from each other to define therebetween a guide channel 5 which is slightly greater in width than the diameter of a shank W2" of the bolt W2 but less than the diameter of a head W2' of the bolt W2. One guide wall 32 has an elongated horizontal guide slot 6 formed throughout its full length and disposed intermediate point. With such construction of the guide member 3, the bolt W2 is supported on the guide member 3 with the head W2' sliding on the upper surface of the vertical guide walls 3c, 3d and with the shank W 2" pending in the guide channel 5. The two rollers 9, 9 (only one shown in FIG. 4) are rotatably mounted on their respective vertical axes 9', 9' and the endless belt unit 4 is disposed alongside of the guide member 3 in such a way that a succession of brushes 12 mounted on the front surface of the endless belt 8 protrude through the slot 7 into the guide channel 5. The rotation of the endless belt 8 around the rollers 9, 9 causes the brushes 12 to brush the shanks W2" of the bolts W2 forward along the guide channel 5.

Figure 5:
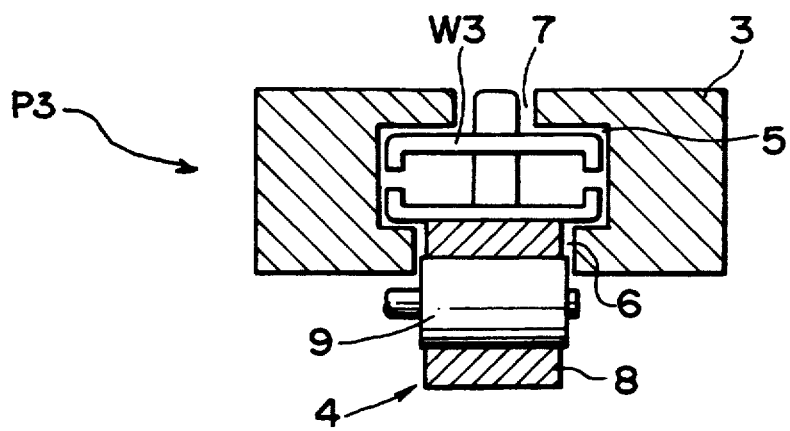
FIG. 5 is a cross-sectional view of a parts-conveying apparatus according to yet another embodiment of the present invention.

FIG. 5 shows the third embodiment of the preset invention wherein the invention is embodied in a parts-conveying apparatus P3 for conveying slider bodies W3 from the parts feeder 1 to the assembling station instead of pull tabs W1. The parts-conveying apparatus P3 according to the third embodiment is substantially identical to that according to the first embodiment with the only exception being that the slot 6 of this embodiment is much greater in width than the slot 6 of the first embodiment and that a substantially rectilinear upper part of the endless belt 8 itself projects through the widened slot 6 into the guide channel 5 over the entire length thereof for positively feeding the slider bodies W3. The outer surface of the endless belt 8, itself, is held in supporting contact with the slider bodies W3 introduced into the guide channel 5 so that the rotation of the endless belt 8 around the rollers 9, 9 causes the outer surface of the endless belt 8 to convey the slider bodies W3 through the guide channel 5.

Figure 6:
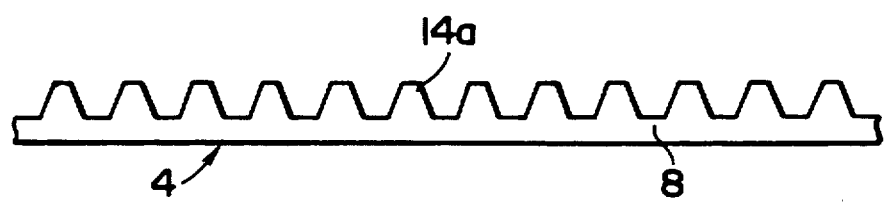
FIG. 6 is a fragmentary side view of an endless belt used with the parts-conveying apparatus of FIG. 5.
Figure 7:
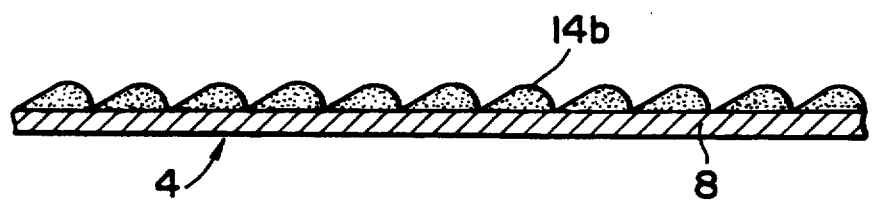
FIG. 7 is a similar view to FIG. 6, but showing another type of endless belt.

The means for ensuring the feed of the parts W is not limited to the succession of brushes 12. As shown in FIG. 6, a rubber endless belt 8 may be provided over the entire peripheral length with alternate ridges and grooves 14a. Alternatively, as shown in FIG. 7, a separate layer 14b of soft synthetic resin may be wrapped on the endless belt 8 over the entire periphery.

With the construction set forth hereinabove, the parts-conveying apparatus according to the present invention can feed parts either horizontally or even upward at an angle so that a parts feeder can be set at a lower position, which could not be done with conventional apparatuses.

By incorporating the means for controlling the rotational rate of the drive source into the parts-conveying apparatus, the parts-conveying apparatus can convey parts from the parts feeder to the assembling station in harmony with the operation speed of an assembling machine.

Provision of means for ensuring the feed of the parts further ensure that parts are conveyed smoothly or without slipping. As a result, even if the guide member is positioned upward at an angle, reliable conveyance of parts can be accomplished.

Furthermore, a stopper rod permits such an arrangement that the rotational rate of the parts-conveying apparatus is rendered a little higher than the rate of operation of the parts assembling machine and the parts are stopped immediately before the assembling station ready for assembling. This arrangement is advantageous in helping to prevent the interruption of the conveyance of parts.

Obviously, the skilled person would realize that various modifications and variations of the present invention are possible in the light of the above teaching. It is therefore to be understood that within the scope of the appended claims the invention may be practiced otherwise than as specifically described, and that the invention is not limited to the embodiments described above in detail.

What is claimed is:

1. A parts-conveying apparatus comprising:
   an elongated guide member having a guide channel extending throughout the entire length of the guide member for supporting parts therein;
   an endless belt unit comprising a pair of rollers and an endless belt wrapped around the rollers, one of the rollers being operatively connected to a drive source, the endless belt having one substantially rectilinear part extending alongside of the guide channel substantially over its entire length in order to feed the parts; and
   a stopper rod disposed beside the guide member and reciprocally movable into and away from the guide channel in order to press the parts against a surface which partly defines the guide channel.

2. A parts-conveying apparatus according to claim 1, the endless belt including means for ensuring the feed of the parts.

3. A parts-conveying apparatus according to claim 2, the feed-ensuring means comprising a plurality of brushes planted at equal intervals around an outer surface of the belt, these brushes being composed of a number of rigid short fibers tightly bonded together.

4. A parts-conveying apparatus according to claim 2, the feed-ensuring means comprising alternate ridges and grooves provided over the entire peripheral length of the endless belt.

5. A parts-conveying apparatus according to claim 2, the feed-ensuring means comprising a separate layer of soft synthetic resin wrapped on the endless belt over the entire periphery.

* * * * *